United States Patent
Glück

(10) Patent No.: US 9,671,168 B2
(45) Date of Patent: Jun. 6, 2017

(54) HEAT EXCHANGER ARRANGEMENT AND PRODUCTION METHOD

(71) Applicant: Modine Manufacturing Company, Racine, WI (US)

(72) Inventor: Rainer Glück, Tübingen (DE)

(73) Assignee: Modine Manufacturing Company, Racine, WI (US)

( * ) Notice: Subject to any disclaimer, the term of this patent is extended or adjusted under 35 U.S.C. 154(b) by 762 days.

(21) Appl. No.: 14/042,932

(22) Filed: Oct. 1, 2013

(65) Prior Publication Data

US 2015/0068717 A1    Mar. 12, 2015

(30) Foreign Application Priority Data

Sep. 11, 2013   (DE) .................. 10 2013 015 179

(51) Int. Cl.

| | |
|---|---|
| *F28D 1/02* | (2006.01) |
| *F28D 1/03* | (2006.01) |
| *B21D 53/04* | (2006.01) |
| *F28F 3/06* | (2006.01) |
| *F02B 29/04* | (2006.01) |
| *F28F 9/007* | (2006.01) |

(Continued)

(52) U.S. Cl.
CPC ........... *F28D 1/0358* (2013.01); *B21D 53/04* (2013.01); *F02B 29/0462* (2013.01); *F28D 1/0333* (2013.01); *F28D 1/0341* (2013.01); *F28D 1/0383* (2013.01); *F28D 9/0056* (2013.01); *F28F 3/06* (2013.01); *F28F 9/0075* (2013.01); *F28D 2021/0082* (2013.01); *F28F 2230/00* (2013.01); *F28F 2275/14* (2013.01); *Y02T 10/146* (2013.01); *Y10T 29/49366* (2015.01)

(58) Field of Classification Search
USPC .............................. 165/69, 76, 78, 153, 157
See application file for complete search history.

(56) References Cited

U.S. PATENT DOCUMENTS

| 4,328,859 A | * | 5/1982 | Bouvot ............. B60H 1/00328 165/149 |
| 4,800,954 A | * | 1/1989 | Noguchi et al. ...... F28D 1/0341 165/153 |

(Continued)

FOREIGN PATENT DOCUMENTS

| EP | 1830048 | 9/2007 | |
| WO | WO 2005001366 A2 | * 1/2005 | ........... F28D 9/0043 |

(Continued)

*Primary Examiner* — Allen Flanigan
(74) *Attorney, Agent, or Firm* — Michael Best & Friedrich LLP

(57) ABSTRACT

A heat exchanger arrangement, for example for an internal combustion engine, having a brazed radiator block (1) which has flow paths (10) formed from pairs of plates and has flow ducts (3) between the plate pairs (P), wherein in each case at least one plate (11) of each plate pair has a plate elongation (12), and wherein the brazed radiator block is arranged in a housing (2) and, at its circumference, is sealed off with respect to the housing. To improve the sealing action between the radiator block (1) and the housing (2), it is provided according to the invention that the plate elongations (12) are formed such that a prescribed dimension of the brazed radiator block (1) can be set by means of deformation of the plate elongations (12).

14 Claims, 7 Drawing Sheets

(51) Int. Cl.
*F28D 9/00* (2006.01)
*F28D 21/00* (2006.01)

(56) References Cited

U.S. PATENT DOCUMENTS

| | | | |
|---|---|---|---|
| 4,914,929 A * | 4/1990 | Shimazaki | B60H 1/00521 165/69 |
| 4,974,670 A * | 12/1990 | Noguchi | F25B 39/024 165/152 |
| 5,086,832 A * | 2/1992 | Kadle et al. | F28D 1/0341 165/76 |
| 5,111,877 A * | 5/1992 | Buchanan et al. | F28D 1/0341 165/152 |
| 5,199,277 A * | 4/1993 | Granstrom et al. | F25D 23/006 165/78 |
| 5,332,032 A * | 7/1994 | Beddome et al. | F28D 1/0341 165/153 |
| 5,632,328 A * | 5/1997 | Sawyer et al. | B60H 1/00321 165/67 |
| 5,931,221 A * | 8/1999 | Inoue et al. | F28D 1/0341 165/153 |
| 5,931,224 A * | 8/1999 | Chevallier | F28D 1/0341 165/153 |
| 6,598,411 B2 * | 7/2003 | Nomura et al. | B60H 1/00521 62/239 |
| 2006/0278377 A1 * | 12/2006 | Martins et al. | F02B 29/0412 165/140 |
| 2007/0163764 A1 * | 7/2007 | Kaga et al. | F28F 1/325 165/151 |
| 2007/0181105 A1 * | 8/2007 | Bazika | F02B 29/0462 123/563 |
| 2008/0087410 A1 * | 4/2008 | Muller-Lufft et al. | F02B 29/0462 165/165 |
| 2008/0185136 A1 | 8/2008 | Vastine et al. | |
| 2010/0096101 A1 * | 4/2010 | Braun et al. | F02B 29/0462 165/41 |

FOREIGN PATENT DOCUMENTS

| | | |
|---|---|---|
| WO | 2013078530 | 6/2013 |
| WO | 2013078531 | 6/2013 |

* cited by examiner

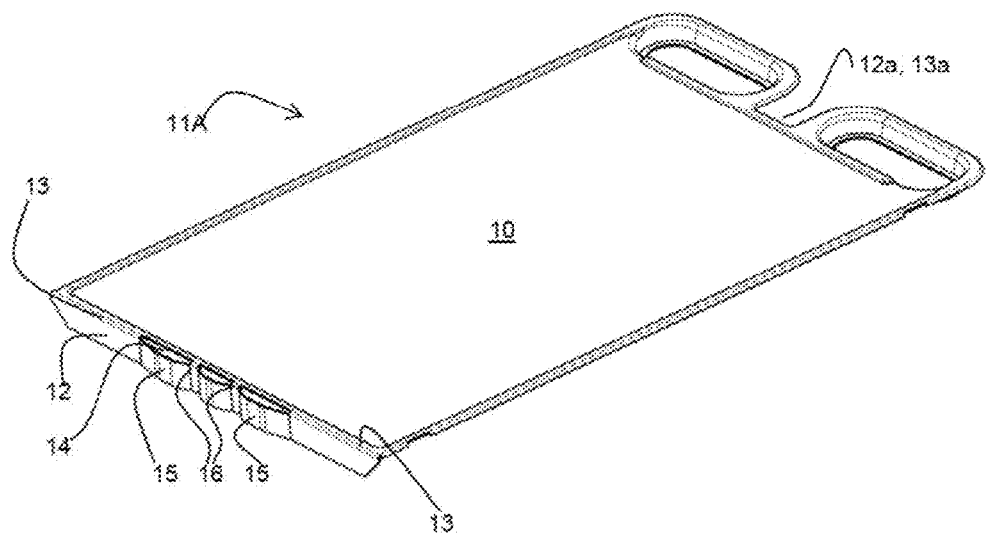
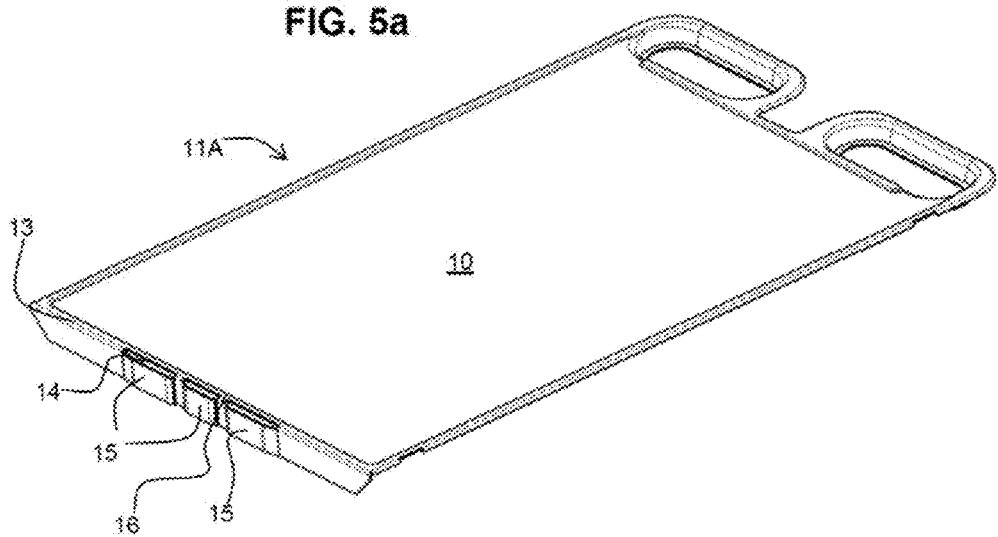

HEAT EXCHANGER ARRANGEMENT AND PRODUCTION METHOD

CROSS-REFERENCE TO RELATED APPLICATIONS

This application claims priority to German Patent Application No. 10 2013 015 179.1, filed Sep. 11, 2013, the entire contents of which are hereby incorporated by reference herein.

BACKGROUND

The invention relates to a heat exchanger arrangement, for example for an internal combustion engine, having a brazed radiator block which has flow paths formed from pairs of plates and has flow ducts between the plate pairs, wherein in each case one plate of each plate pair has a plate elongation, wherein the brazed radiator block is arranged in a housing and, at its circumference, is sealed off with respect to the housing walls.

The invention also relates to a production method for heat exchanger arrangements.

The described heat exchanger arrangement is known from the prior patent application with the file reference DE 10 2012 008 700.4.

The plate elongations claimed in the prior patent application have the task of blocking the flow of the charge air to be cooled through the flow ducts in the region in which said plate elongations are arranged, and thereby diverting the charge air to the center of the radiator block, where the exchange of heat can be performed with greater effectiveness. Said plate elongations also form a substantially smooth contour on the radiator block, which can be sealed off more easily with respect to the housing in order to eliminate bypasses.

SUMMARY

It has now been identified that the quality of the sealing action is not yet good enough. It remains possible for an uncooled air stream to flow, in the manner of a bypass, between a housing wall and the radiator block, whereby the efficiency of the exchange of heat is reduced.

The insertion of additional seals, such as is provided in numerous other publications from the prior art, is undesirable from a cost aspect.

One object of the invention is primarily that of providing a heat exchanger arrangement and a corresponding production method which lead to a further improved sealing action between the radiator block and the housing and which are expedient from a cost aspect.

Said object is achieved according one embodiment by means of a heat exchanger arrangement that has the features of claims and by means of a production method according to the claims.

One important aspect of the invention is considered to be that of the plate elongations being formed such that a prescribed dimension of the brazed radiator block can be produced by means of deformation of the plate elongations. What is considered to be particularly simple and advantageous is a refining embodiment that has at least one plate cutout or one slot in a bending edge of each of the plate elongations, and at least one bulged protuberance in the plate elongations.

In one practical exemplary embodiment, it is provided that multiple plate cutouts or slots are arranged in the bending edge, wherein each cutout is assigned a corresponding bulged protuberance in the plate elongation.

It is not imperatively necessary for a bending edge to be provided on the plate elongation as early as during the production of the plates. The plate elongation may initially also extend in the direction of the plate plane, wherein a bending edge may first be produced, thereby shortening the length of the radiator block, during the course of the deformation process on the brazed radiator block, in accordance with the production method described below.

The inventor has identified that the radiator block distorts during the course of the brazing process. During the brazing process, (small) movements of the plate pairs and of the fins arranged between the plate pairs take place, which movements are indeed the main cause of said distortion. The result is that the dimensions of the radiator block change slightly, whereby detrimental bypasses are formed between the radiator block and the housing.

Based on this realization, the inventor has arrived at the proposed invention, whereby the insertion of additional seals between the radiator block and the housing can also be substantially eliminated.

In the production method according to one embodiment of the invention for a heat exchanger arrangement, a calibration of the brazed radiator block is performed in a deformation tool. The calibration results in a radiator block which fits perfectly into the housing, and which has at least noticeably smaller air bypasses, or even no air bypasses whatsoever. The production method according to the invention may also be used for heat exchanger arrangements whose brazed radiator block is of a construction that differs from that of the heat exchanger arrangement according to the invention. Such radiator blocks have for example flat tubes instead of plate pairs.

The proposed plate elongations are additional material portions on the plates. The plates are accordingly longer than they would need to be to perform the actual function of the radiator block.

The invention is also based on the realization that such additional material portions may be used for the compensation of manufacturing tolerances. Said additional material portions are however generally not cut off, such as is otherwise conventional in other areas of assembly work, but rather are deformed, such that, after said calibration by means of a deformation tool or the like, the brazed radiator block has the prescribed dimension.

In other words, the additional material portions or the plate elongations are used according to the invention in order to improve the sealing action of the radiator block in the housing.

Further features are presented in the dependent patent claims, which features will not be listed at this juncture merely in order to avoid repetitions.

Furthermore, the further features and the effects thereof will also emerge from the following description of preferred exemplary embodiments of the invention, in which reference is made to the appended drawings.

BRIEF DESCRIPTION OF THE DRAWINGS

FIG. 4 shows a first plate with a plate elongation before the calibration of the radiator block;

FIG. 5a shows the first plate after the calibration;

FIG. 5b shows another view of the first plate from FIG. 5a;

DETAILED DESCRIPTION

Figure 1:
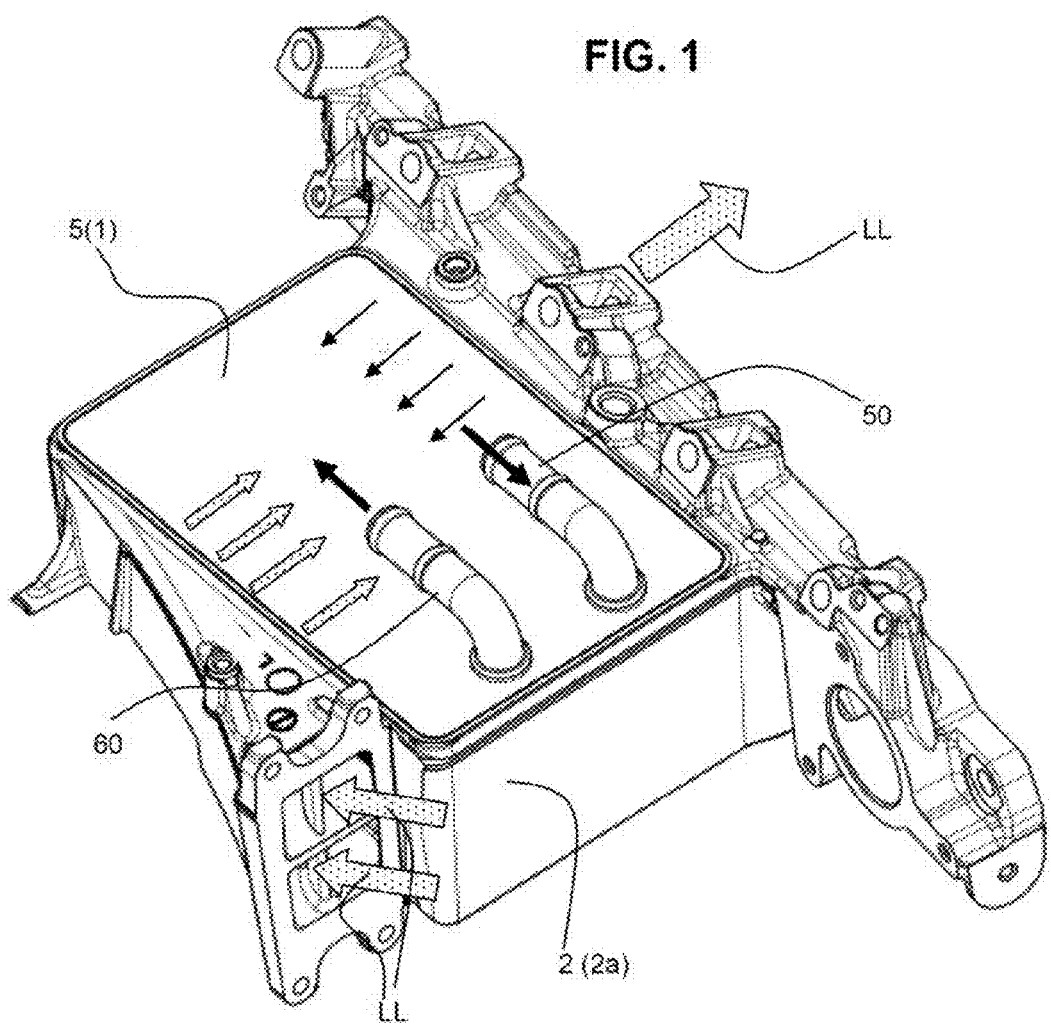
FIG. 1 shows a perspective view of a heat exchanger arrangement.
Figure 8:
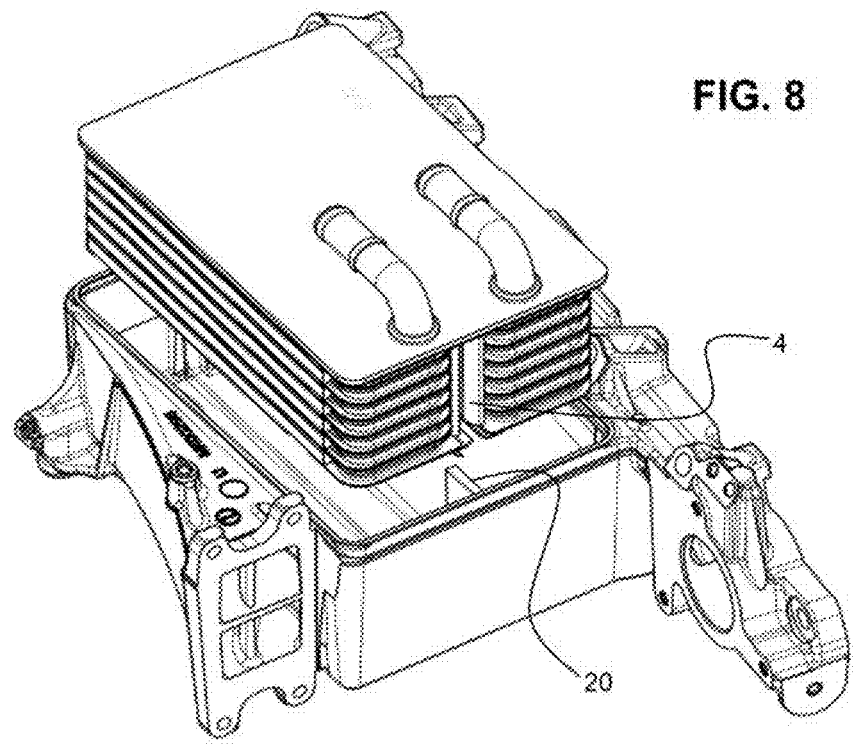
Figure 9:
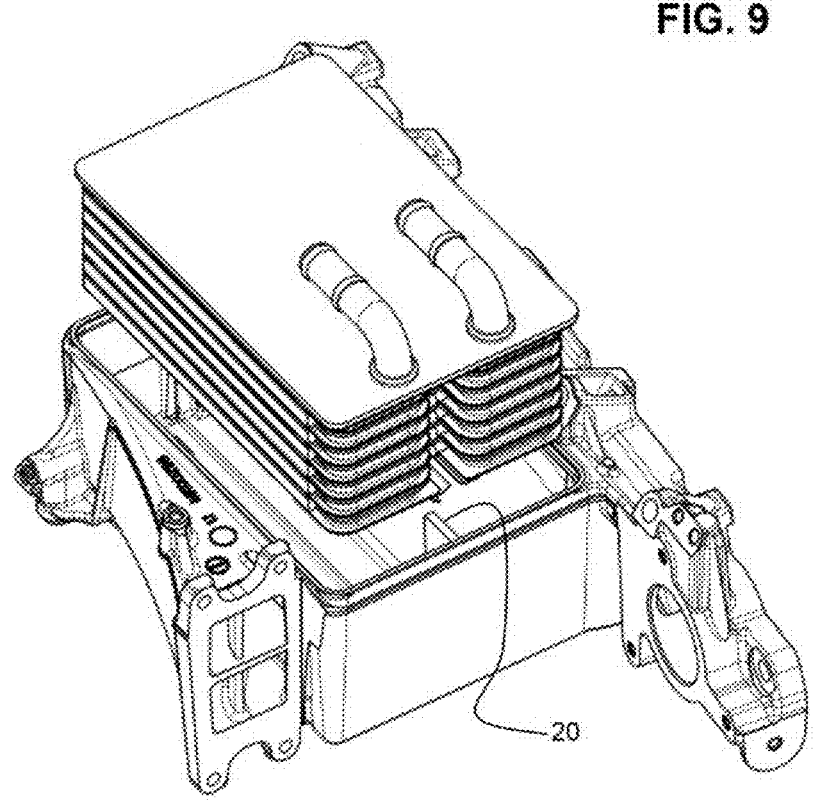

The heat exchanger arrangement as shown in FIGS. 1, 8 and 9 is used as an indirect charge-air cooler in a motor vehicle for cooling compressed charge air that is supplied to an internal combustion engine. Said heat exchanger arrangement may also be used for other purposes, and may even be used in non-automotive applications.

Figure 2:
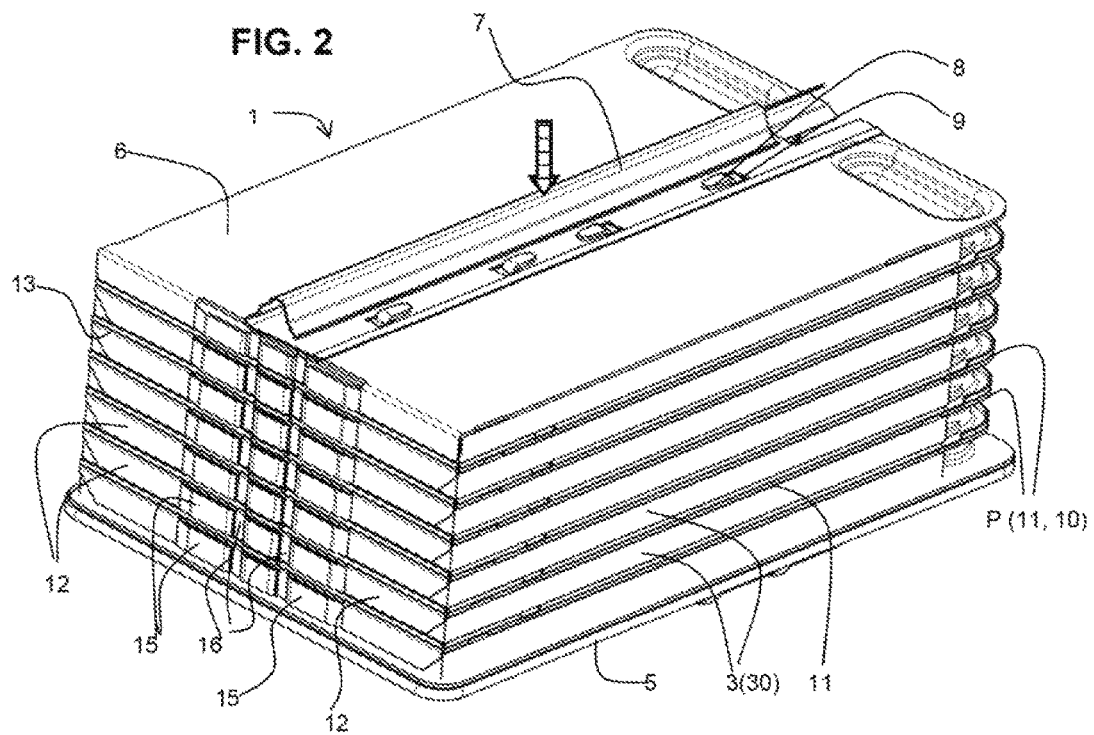
FIG. 2 shows a perspective view of the radiator block as part of the arrangement.
Figure 3:
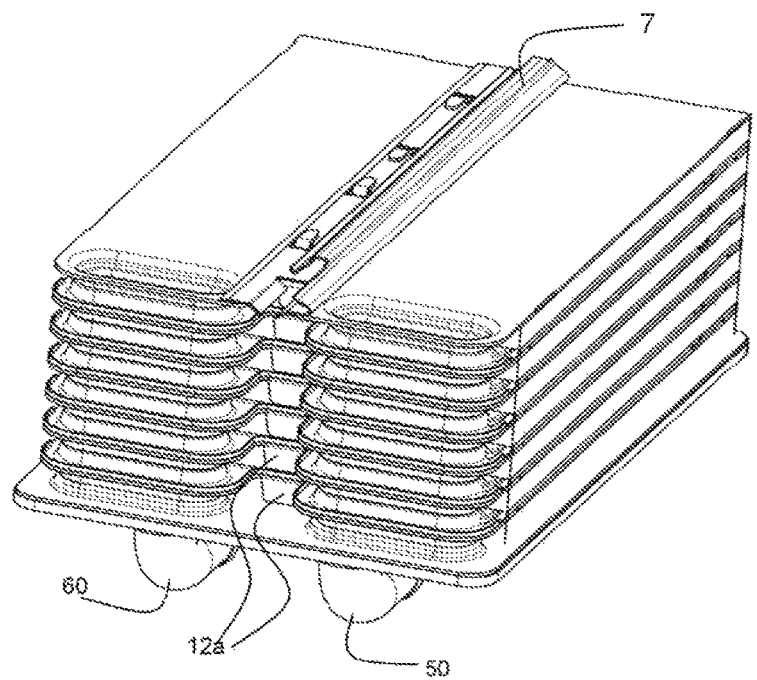
FIG. 3 shows another perspective view of the radiator block.

FIGS. 1 to 3 show an inlet connector 50 and an outlet connector 60 for a cooling liquid, said inlet connector and outlet connector being fastened to a top plate 5 which belongs to a brazed radiator block 1. The external features of the housing 2 illustrated in FIG. 1 et al. shall be discussed here only insofar as to state that said housing has situated thereon inlets for charge air LL to be cooled and, on the opposite side, outlets for cooled charge air (not shown), as marked by block arrows.

The radiator block has flow paths 10 for the cooling liquid, said flow paths being formed, in the exemplary embodiments shown, from pairs P of plates 11A, 11B. Between the plate pairs P there are situated flow ducts 3 in which cooling fins 30 are arranged. The charge air LL to be cooled flows through the flow ducts 3 with the cooling fins 30.

Figure 5B:
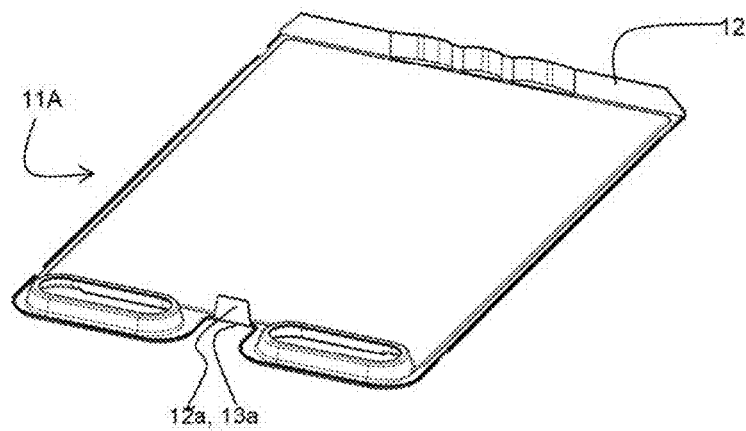
Figure 6:
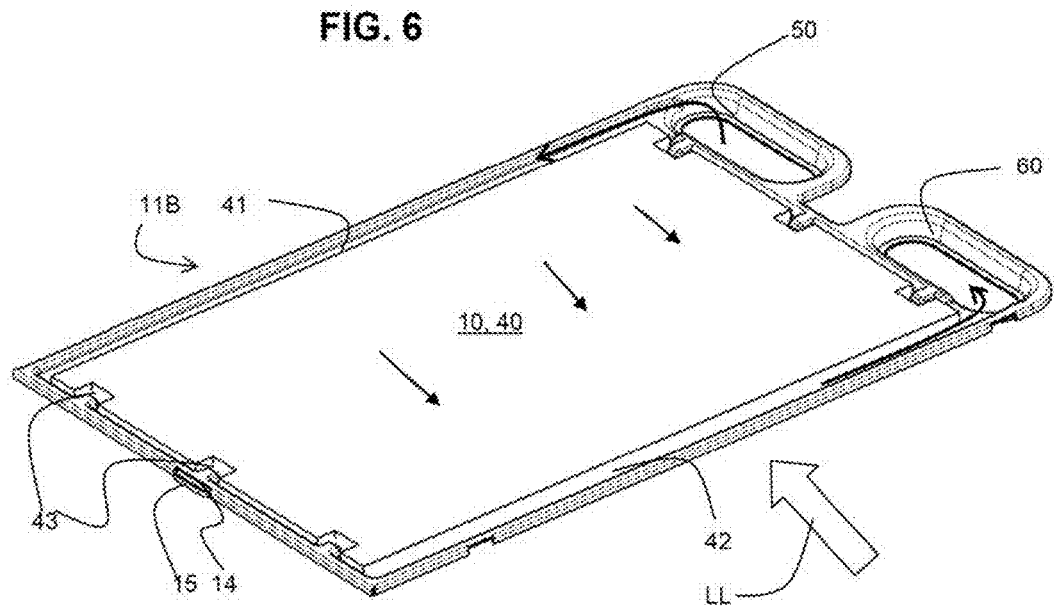
FIG. 6 shows a second plate with a lamella that is situated in a flow path.

The cooling liquid and the charge air flow approximately in a countercurrent configuration through the radiator block 1, whereby a highly efficient exchange of heat is achieved. The countercurrent configuration is realized by virtue of lamellae 40 being situated in the flow paths 10, which lamellae permit a throughflow in a longitudinal and a transverse direction. To force the cooling liquid to flow in the transverse direction, in each flow path 10, a first edge duct 41 is situated between the lamella 40 and the edge of the path. Said edge duct 41 is connected in terms of flow to the inlet 50. A second edge duct 42 at the opposite edge of the path 10 is connected to the outlet 60 (FIG. 6). Positioning aids 43 for the lamella 40 are also situated in the flow paths 10, which positioning aids are formed by projections in the edge of the plate 11B and matching cutouts in the lamella 40. During the pre-assembly process, the plate 11A shown in FIGS. 5a and 5b and the plate 11B shown in FIG. 6 are joined together with the lamella 40 so as to form a plate pair P. With regard to further details, reference is made in this regard to the prior patent application with the file reference DE 10 2012 006 346.6.

The radiator block 1 that has already been inserted into the housing 2 in FIG. 1 has previously been brazed in a brazing furnace, in which regard reference is made to conventional techniques. The construction of the radiator block 1 already outlined above emerges, with the degree of clarity required here, from FIGS. 2 and 3.

In each case one plate 11A of each plate pair P has a plate elongation 12. The plate elongations 12 are formed such that a prescribed dimension of the brazed radiator block 1 can be produced by deformation of the plate elongations 12. In the exemplary embodiment, to achieve this result, each of the plate elongations 12 has a bending edge 13. In the bending edges 13 there are situated for example three plate cutouts 14 or slots. Furthermore, the plate elongations 12 are provided with bulged protuberances 15, wherein the bulged protuberances are assigned to in each case one plate cutout 14. This means that the bulged protuberances 15 extend approximately over the length of a plate cutout 14. A web 16 is situated in the bending edge 13 between the cutouts 14. It has proven to be expedient for a similar plate cutout 14 with bulged protuberance 15 to also be provided on the edge of the plate 11B, as is likewise shown in FIG. 6.

The deformation of the plate elongations 12 that takes place during the course of the calibration of the radiator block 1 in a deformation tool 18 can be seen from a comparison of FIGS. 4 and 5a. As can be seen, the bulged protuberances 15 in FIG. 5a (and also in FIG. 6) are flatter than those in FIG. 4, which is the result of the deformation process shown in FIG. 11.

The radiator block 1 thus has a length dimension that fits perfectly into the housing 2. The height of the radiator block 2 is also calibrated in the deformation tool 18, for which purpose the deformation tool 18 acts on an elastic sealing strip 7 in the direction of the arrow in FIG. 2. Here, the legs of the sealing strip 7 may be flared slightly by bending. As a result, the sealing strip 7 will bear with the required pressing force against the bulge 21 (FIG. 7) of the housing 2, and improve the sealing action.

The plate elongations 12 may also be of some other configuration. They must in any case be suitable for producing, through the deformation thereof, a predefined dimension of the radiator block. This may for example be realized by virtue of the bending edge first being produced (not shown) during the course of the calibration, described below, of the radiator block.

In the embodiments shown, the plate elongations 12 extend approximately as far as the adjacent plate pair P.

Figure 7:
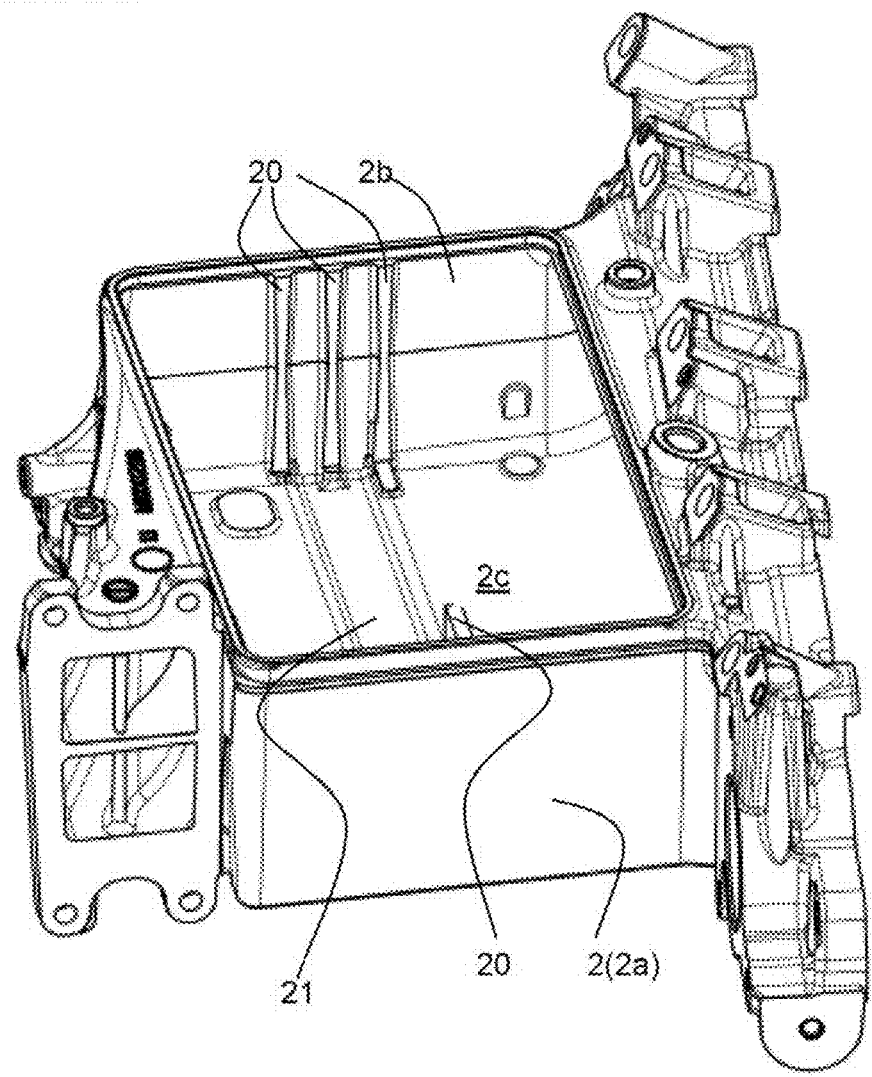
FIGS. 7 to 9 show the mounting of the radiator block in a housing with or without an elastic sealing lip.

In the interior of the housing 2 there is arranged a strip 20 which extends in a direction of insertion of the radiator block 1 into the housing 2. FIG. 7 shows multiple strips 20 on opposite first and second housing walls 2a, 2b. The strips are formed integrally with said housing walls 2a, 2b.

Figure 10:
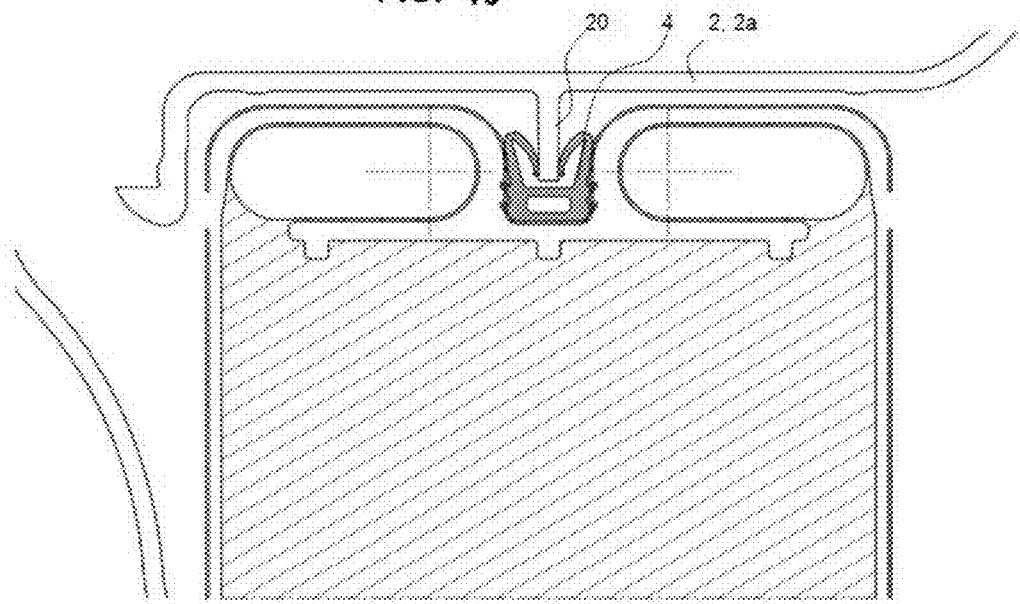
FIG. 10 shows an optionally inserted sealing lip in section.

The strip 20 on the front housing wall 2a may optionally cooperate with an elastic sealing lip 4 in order to provide yet further improved sealing of a spacing between the strip 20 and the brazed radiator block 1 (FIGS. 8 and 10). Such sealing lips 4 are provided in conjunction with the specific form of the plates 11A, 11B which have the inlets and the outlets in projections of the plates 11, wherein between said projections there is provided a space which can be sealed off more effectively and in which the sealing lip 4 is positioned.

The strips 20 cooperate with said webs 16 in order to improve the sealing action and the positional fixing of the radiator block 1 in the housing 2.

The brazed radiator block 1 has a top plate 5 (already mentioned above) which projects beyond the circumference of said radiator block and which serves for fastening in the housing 2, more precisely to the edge of an insertion opening of the housing 2, in a manner not shown here.

A base plate 6 is also situated on the radiator block 1 (FIG. 2). Said elastic sealing strip 7 has been fastened to the base plate 6 by means of tongues 8 and openings 9 after the brazing of the radiator block 1. The elastic sealing strip 7 performs the sealing action with respect to an adjacent third housing wall 2c. For this purpose, the third housing wall 2c has a bulge 21 with which the sealing strip 7 makes contact (FIG. 7).

As can be seen from the illustrations, the sealing strip 7 and the at least one bulged protuberance 15 in the plate elongations 12 are situated approximately on a common cross-sectional plane of the radiator block 1, and in the exemplary embodiment approximately in the center of the radiator block 1.

Said base plate 6 has also been equipped with a plate elongation 12 which, in the exemplary embodiment, is of identical form to those on the plates 11A.

A further plate elongation 12a is arranged on the opposite side of the plate 11A, which further plate elongation likewise has a bending edge 13a. The further plate elongation 12a extends in the same direction as the former plate elongations 12. Said further plate elongation however has a different function because it is a positioning aid for the cooling fins 30 in the flow ducts 3 in order to facilitate the pre-assembly of the radiator block 1 (FIGS. 3 and 5b).

Figure 11:
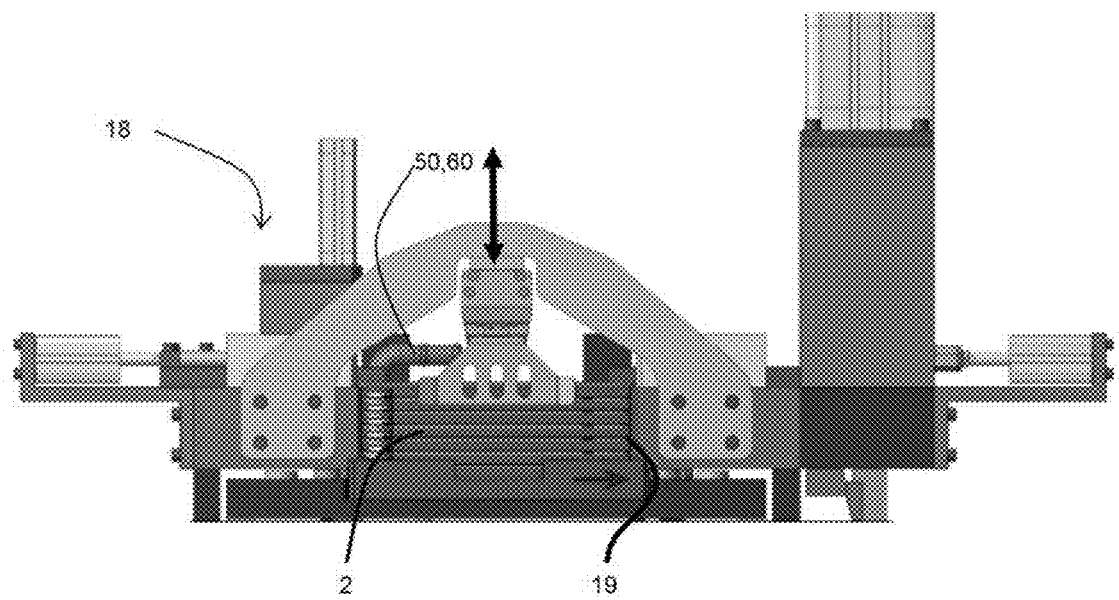
FIG. 11 shows the already-brazed radiator block in a deformation tool.

FIG. 11, already mentioned above, shows a radiator block 2 situated in the deformation tool 18. The radiator block 2 is placed into a receptacle 19 of the tool 18. Horizontally and vertically movable carriages act on the radiator block 2 and produce the prescribed dimension of the latter.

What is claimed is:

1. A heat exchanger arrangement for use with an internal combustion engine, comprising:
   a brazed radiator block having flow paths formed from pairs of plates and flow ducts between the pairs, at least one plate of each plate pair having a plate elongation, and having a top plate and a base plate;
   a housing into which the brazed radiator block is arranged, the brazed radiator block being sealed at its circumference with respect to the housing; and
   an elastic sealing strip arranged on the base plate to perform the sealing action with respect to an adjacent housing wall, wherein said housing wall has a bulge with which the sealing strip makes contact.

2. The heat exchanger arrangement according to claim 1, wherein at least one plate cutout or one slot is arranged in a bending edge of each of the plate elongations, and, in the plate elongations, at least one bulged protuberance is assigned to the plate cutout or to the slot.

3. The heat exchanger arrangement according to claim 2, wherein the bent plate elongations extend approximately as far as the adjacent plate pair.

4. The heat exchanger arrangement according to claim 2, wherein multiple plate cutouts or slots are arranged in the bending edge, wherein each cutout is assigned a corresponding bulged protuberance in the plate elongation.

5. The heat exchanger arrangement according to claim 4, wherein connecting webs are arranged in the bending edge between the cutouts.

6. The heat exchanger arrangement according to claim 1, wherein, in the housing, there is arranged at least one strip which extends in a direction of insertion of the radiator block into the housing.

7. The heat exchanger arrangement according to claim 6, wherein multiple strips extend on opposite first and second housing walls, which strips are formed in one piece with said housing walls.

8. The heat exchanger arrangement according to claim 7, wherein at least one of the strips cooperates with an elastic sealing lip in order to seal off a spacing between the strip and the brazed radiator block.

9. The heat exchanger arrangement according to claim 7, wherein the strips cooperate with the webs in order to improve the sealing action and the positional fixing of the radiator block in the housing.

10. The heat exchanger arrangement according to claim 1, wherein the elastic sealing strip is composed of metal and is mounted on the base plate after the brazing of the radiator block, for which purpose bendable tongues or the like engage through openings in the sealing strip.

11. The heat exchanger arrangement according to claim 1, wherein the base plate (6) also has a plate elongation (12).

12. The heat exchanger arrangement according to claim 2, wherein the sealing strip and the at least one bulged protuberance in the plate elongations are arranged approximately on a common cross-sectional plane of the radiator block, approximately in the center of the radiator block.

13. The heat exchanger arrangement according to claim 1, wherein said plate elongation is a first plate elongation and wherein a second plate elongation is arranged on the opposite side of the plate, the second plate elongation likewise having a bending edge, wherein the second plate elongation extends in the same direction, approximately as far as the adjacent plate pair, as the first plate elongation.

14. The heat exchanger arrangement according to claim 13, wherein the second plate elongation functions as a positioning aid for a cooling fin which is situated in the flow ducts.

* * * * *